(12) United States Patent
Huang et al.

(10) Patent No.: US 8,229,247 B1
(45) Date of Patent: Jul. 24, 2012

(54) METHOD AND APPARATUS FOR STRUCTURE PRESERVING EDITING IN COMPUTER GRAPHICS

(75) Inventors: Qi-xing Huang, Stanford, CA (US); Nathan A. Carr, San Jose, CA (US); Radomir Mech, Mountain View, CA (US)

(73) Assignee: Adobe Systems Incorporated, San Jose, CA (US)

( * ) Notice: Subject to any disclaimer, the term of this patent is extended or adjusted under 35 U.S.C. 154(b) by 887 days.

(21) Appl. No.: 12/334,933

(22) Filed: Dec. 15, 2008

Related U.S. Application Data

(60) Provisional application No. 61/098,653, filed on Sep. 19, 2008.

(51) Int. Cl.
*G06K 9/36* (2006.01)
*G09G 5/00* (2006.01)
*H04N 9/74* (2006.01)

(52) U.S. Cl. .................. 382/276; 345/619; 348/580

(58) Field of Classification Search .................. 382/276, 382/293, 294, 295, 298, 299; 345/619, 621, 345/622, 646, 647; 348/580; 708/442
See application file for complete search history.

(56) References Cited

U.S. PATENT DOCUMENTS

| 6,525,744 B1* | 2/2003 | Poggio et al. | 345/619 |
|---|---|---|---|
| 2007/0185946 A1* | 8/2007 | Basri et al. | 708/200 |
| 2009/0220171 A1* | 9/2009 | Liu et al. | 382/282 |

OTHER PUBLICATIONS

Martin Marinov, et al., "Automatic Generation of Structure Preserving Multiresolution Models," Eurogrphics 2005, vol. 24, No. 3, 2005, 8 pages.
Daniel C. Berkenstock, et al. "Structure-Preserving Parametric Deformation of Legacy Geometry," American Institute of Aeronautics and Astronautics, 12th AIAA/ISSMO Multidisciplinary Analysis and Optimization Conference, Sep. 10-12, 2008, 16 pages.
Alexandrine Orzan, et al., "Structure-preserving manipulation of photographs," ACM 2007, 10 pages.

* cited by examiner

*Primary Examiner* — Yon Couso
(74) *Attorney, Agent, or Firm* — Robert C. Kowert; Meyertons, Hood, Kivlin, Kowert & Goetzel, P.C.

(57) ABSTRACT

A method is operable to receive an image, where the image includes an input scene, which in turn includes one or more objects. The method associates a non-regular distribution of pins with the input scene, wherein each pin is associated with a respective portion of the input scene, wherein said associating transforms the image into a first deformation domain. The method can receive input specifying symmetry between the one or more objects in the input scene. The method may receive input to deform the input scene, and using that input, map the input scene from the first deformation domain into a second deformation domain, generating a corresponding output scene, while preserving the symmetry. The method detects structural and/or local similarities between the first and the second domain, and transforms the output scene from the second deformation domain into an output image while preserving both the structural and the local similarities.

55 Claims, 6 Drawing Sheets

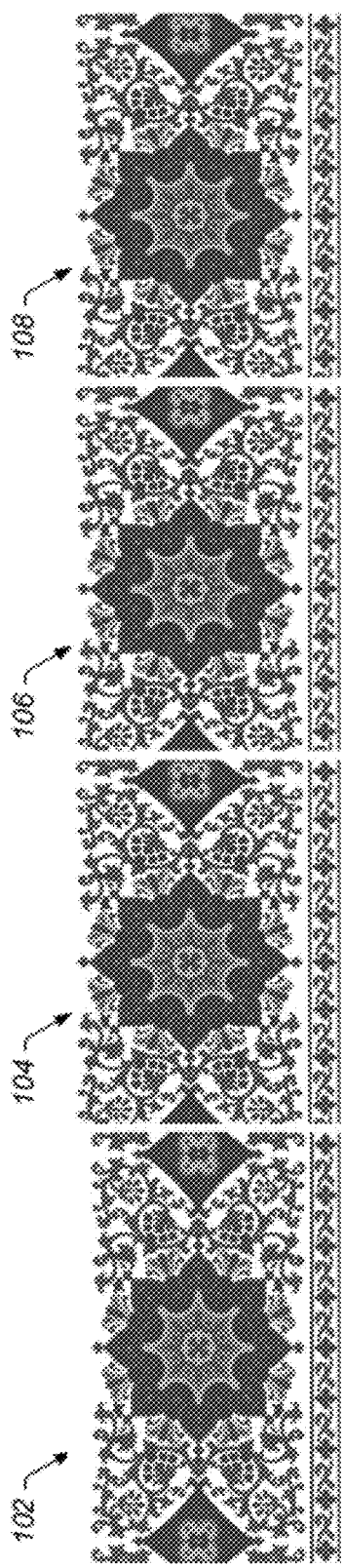
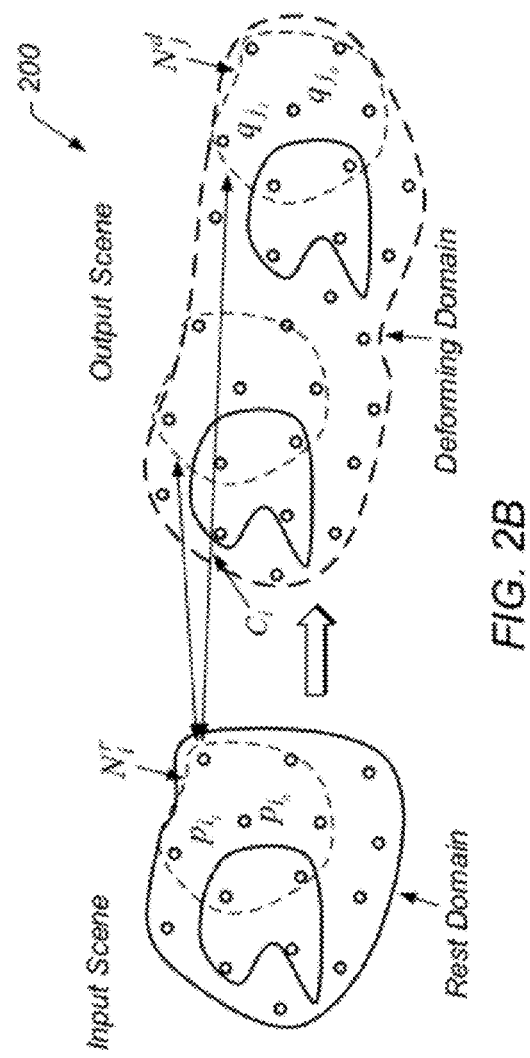
FIG. 1A  FIG. 1B  FIG. 1C  FIG. 1D
FIG. 2B

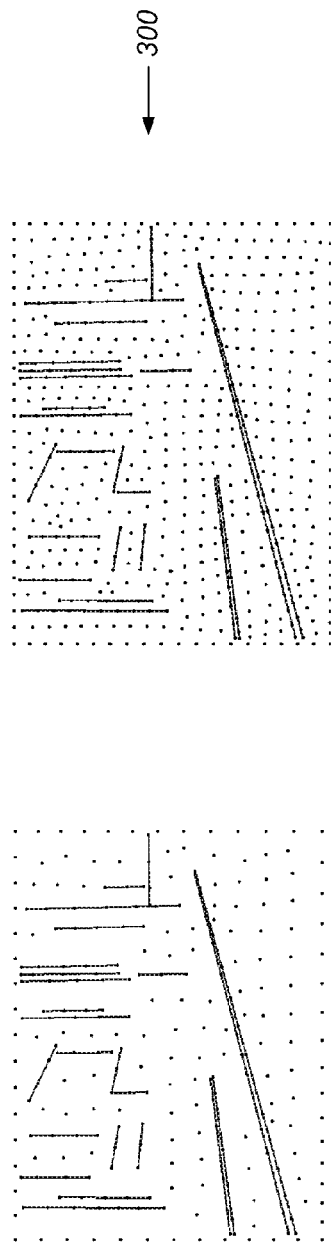
FIG. 3B
FIG. 3A
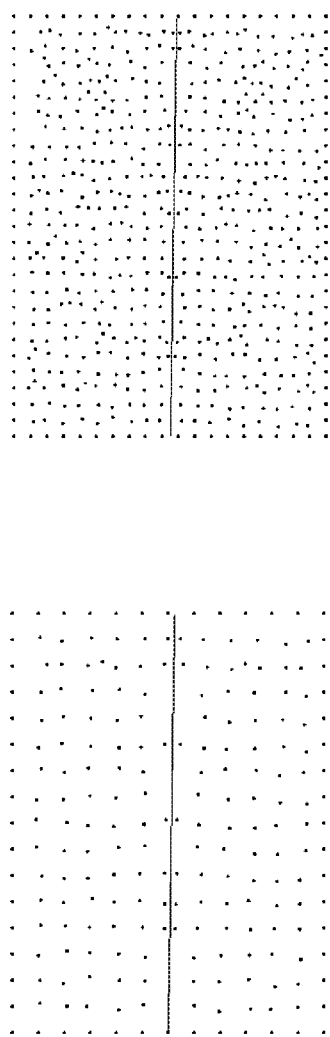
FIG. 3D
FIG. 3C

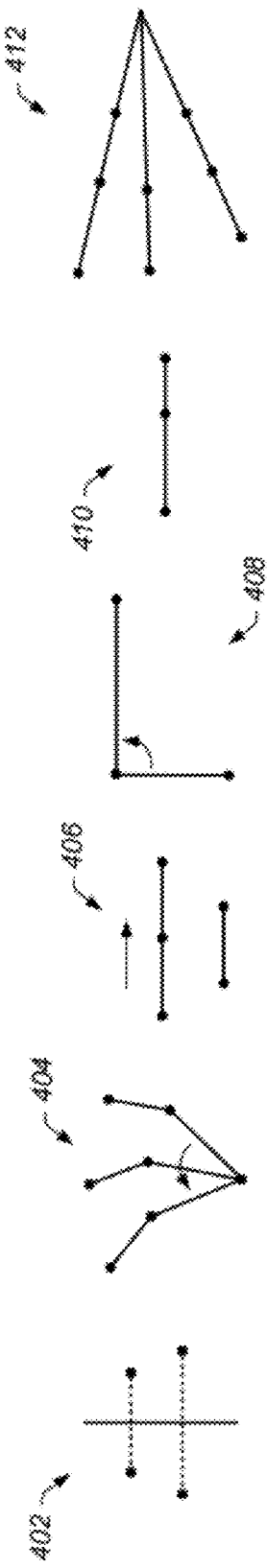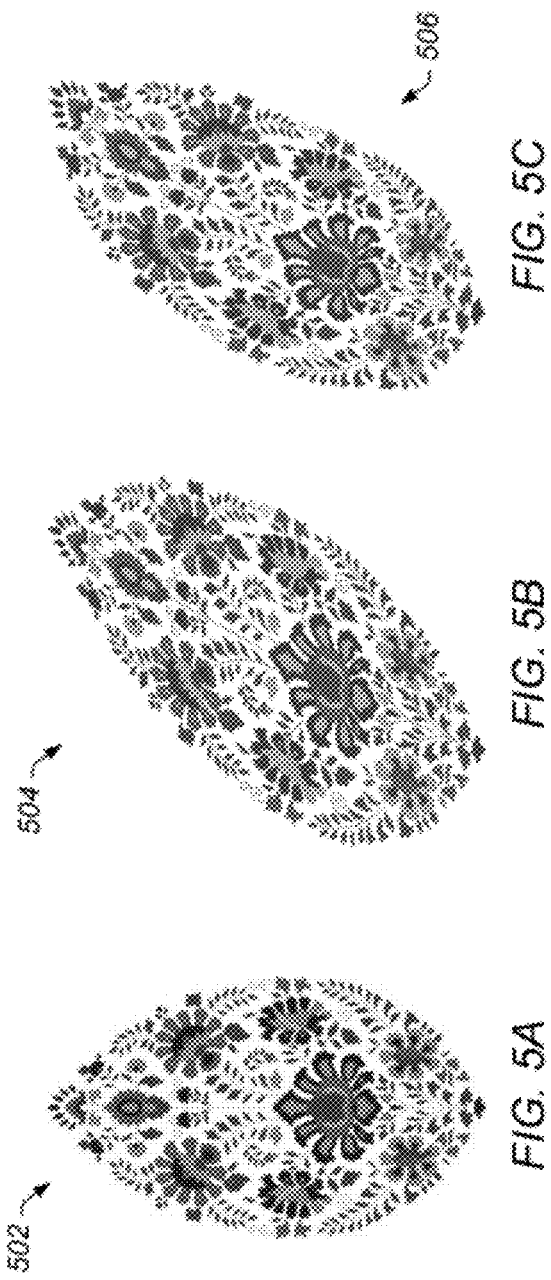
FIG. 4A  FIG. 4B  FIG. 4C  FIG. 4D  FIG. 4E  FIG. 4F
FIG. 5A  FIG. 5B  FIG. 5C

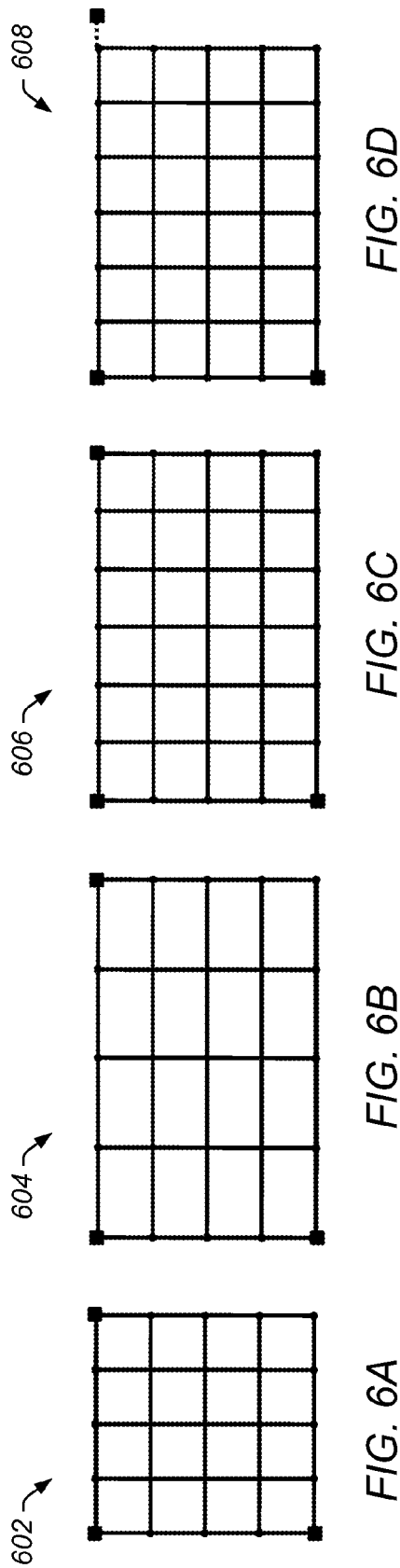

METHOD AND APPARATUS FOR STRUCTURE PRESERVING EDITING IN COMPUTER GRAPHICS

PRIORITY DATA

This application claims benefit of priority to U.S. Provisional Application Ser. No. 61/098,653 titled "Method and Apparatus for Structure Preserving Editing in Computer Graphics", filed Sep. 19, 2008, whose inventors are Qi-xing Huang, Nathan Can, and Radomir Mech, and which is hereby incorporated by reference in its entirety.

BACKGROUND

1. Field of the Invention

The present invention is directed to structure preserving deformations in digital images.

2. Description of the Related Art

Creating meaningful deformations of digital shapes with respect to user interactions is a long-standing problem with its applications spanning numerous areas of computer graphics. In computer animation, shape deformation is used to create active characters. In geometry processing, shape deformation can be used to smooth and match geometric objects. Moreover, shape deformation is used in shape modeling to save human labor. So far, most of the research in shape deformation focuses on preserving high frequency signals such as shape details or articulated structures such as skeletons.

Besides shape details and articulated structures, many digital shapes possess rich global structures which relate different parts of the digital shapes. Representative structures include various symmetries, grid patterns and some shape structures such as line features. Usually, the human visual system is sensitive to these global structures.

Thus, it is important to preserve these structures for realistic editing of digital shapes. Moreover, symmetries are ubiquitous in our daily lives, and so from the perspective of modeling, it may be important to preserve symmetries. Despite the tremendous advances in detail-preserving and skeleton-driven editing, little work on has been done regarding structure preserving editing.

SUMMARY

Embodiments of a method and apparatus for structure preserving deformations in digital images are described.

The method may operate to receive an image, wherein the image comprises an input scene, wherein the input scene comprises one or more objects. The method may associate a non-regular distribution of pins with the input scene, wherein each pin is associated with a respective portion of the input scene. The input scene can include vector art. Thus the pins may be distributed in a non-grid-like manner. The process of associating pins transforms the image into a first deformation domain (such as a rest deformation domain). Since the pins are not arranged in a regular grid-like distribution, the cost associated with the distribution of pins may be lower (than would be the case with a regular grid distribution) as some redundant/unnecessary points may not be implemented. Furthermore, the pin distribution may be able to better define objects in the input scene.

The method may receive symmetry information regarding symmetry among the one or more objects in the input scene. The received symmetry information may be detected or determined in response to user input to an application (such as a user manually indicating objects, some of which may not even be symmetrical), and/or by the application detecting symmetry in the input scene (such as symmetry along paths in vector art). In one embodiment, the method may receive input to deform the input scene, such as a stretching operation. Next, based on, or in response to, the input, the method may map the input scene from the first deformation domain, e.g., the rest domain, into a second deformation domain. The method may perform the mapping while preserving the symmetry.

The method may detect both structural similarities and local similarities between the first and the second deformation domains, and transform an output scene from the second deformation domain into an output image while preserving both the structural and the local similarities. An optimization may be performed that maximizes both the structural and the local similarities while satisfying the user input. The optimization may use a multi-stage process that operates at interactive rates (e.g., in real-time).

BRIEF DESCRIPTION OF THE DRAWINGS

FIGS. 1A-D illustrate examples of stretching vector art that has rich symmetry information, where FIG. 1A shows an exemplary input image, FIG. 1B shows an output of a stretching operation using uniform scaling, FIG. 1C shows an output of a stretching operation using symmetry preserving scaling, and FIG. 1D shows an output of a stretching operation using an optimized repetition count, according to some embodiments;

FIG. 2B illustrates an example of an input scene being embedded into a first or rest deformation domain, while an output scene is embedded into a second deformation domain, according to some embodiments;

FIGS. 3A through 3D graphically illustrate a process of deformation domain initialization, according to some embodiments.

FIGS. 4A-F illustrate exemplary structures that the method may preserve, where FIG. 4A shows reflectional symmetry, FIG. 4B shows rotational symmetry, FIG. 4C shows translational symmetry, FIG. 4D shows a fixed angle, FIG. 4E shows a line segment, and FIG. 4F shows a vanishing point, according to some embodiments;

FIGS. 5A-C illustrate that preserving the reflectional symmetry approximately may yield a more realistic looking example, where FIG. 5A shows input, FIG. 5B shows symmetry preservation, and FIG. 5C shows result without symmetry preservation, according to some embodiments;

FIGS. 6A-D illustrates an example of optimizing the repetition count of a grid pattern, with FIG. 6A showing an exemplary original pattern; FIG. 6B showing an estimated region after deformation, FIG. 6C showing a deformation domain with optimized repetition count, and FIG. 6D showing an exemplary optimized pattern, according to some embodiments.

Figure 2A:
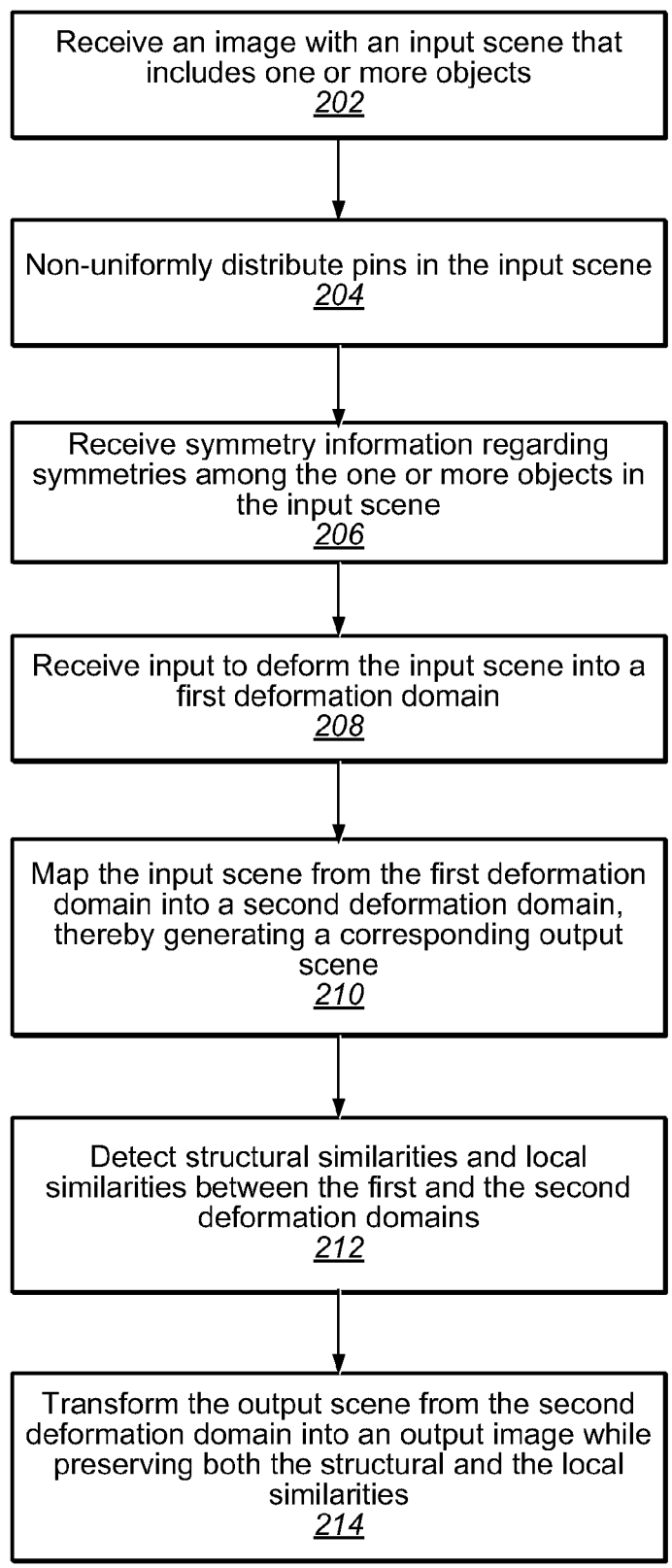
FIG. 2A is an exemplary flowchart of a method for structure preserving editing using generalized embedded deformation, according to one embodiment.

While the invention is described herein by way of example for several embodiments and illustrative drawings, those skilled in the art will recognize that the invention is not limited to the embodiments or drawings described. It should be understood, that the drawings and detailed description thereto are not intended to limit the invention to the particular form disclosed, but on the contrary, the intention is to cover all modifications, equivalents and alternatives falling within the spirit and scope of the present invention. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for structure preserving deformations in digital images are described.

In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software. Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Embodiments of a method for preserving global structures, i.e., global features, of a scene when manipulating the scene are presented The global structures or features of a scene may include one or more symmetries, grid pattern(s) and line feature(s). In some embodiments, the method may only operate to preserve strong global structures, whereas in other embodiments the method may preserve weaker global structures in addition to, or instead of, the strong global structures.

In some embodiments, the method may utilize a generalized embedded deformation framework for structure preserving editing of vector arts and images. In some embodiments, the method may maintain two deformation domains ("domains")—a first deformation domain, which may be referred to as a rest domain, and a second deformation domain in which input (or rest) and output scenes of an image are embedded, respectively. In other embodiments, additional deformation domains may be used in addition to, or instead of, these two domains. In some embodiments, the method may use one or more intermediate scenes in addition to the input and output scenes.

The method may use the two or more embeddings described above to characterize a relation between the rest (i.e., input) and output scenes (i.e., by a mapping between the rest (first) and second deformation domains). Thus structure preserving may be formulated as an optimization problem, where the method may seek to achieve one or more goals of optimizing, e.g., maximizing, any structural and local similarities between the first and second deformation domains, and/or satisfying constraints or goals based on user input.

The method may use various optimization strategies to achieve real-time performance. In particular, when preserving grid patterns, the method may optimize the number of repetitions as a special type of structure preservation. The method may be used for efficient interactive editing of various vector arts and images.

In some embodiments, a method may preserve one or more types of global structures including line features, symmetries and grid patterns. Line features may include line segments and vanishing points that may be rich in natural images. Symmetries may be described by reflectional, rotational, and/or translational symmetries which may be the major features of vector arts. Repetition counts of grid patterns (such as in vector arts) may be optimized as a special type of structure preservation.

A generalized embedded framework may be used for preserving global structures. In some embodiments, an embedded deformation framework may be used to manipulate complex scenes at iterative rates by decoupling geometry and deformation, and further to preserve structures and handle topological changes due to the modification of repetition counts of grid patterns. The method may maintain one or more deformation domains including a rest or first deformation domain and/or a second deformation domain in which the input and/or output scenes may be respectively embedded.

With one or more of these embeddings, the relation between the rest and/or input scene and the output scene may be described by a mapping between the first (rest) and second deformation domains. In some embodiments, the relation between the input and/or the rest scenes and the output scenes may be described by a mapping between other domains. Topological changes may be achieved by allowing different configurations of the various domains, such as the first (rest) and/or second deformation domains. Structure preservation may be achieved by embedding the structures into the domains, such as into the first deformation (rest) domain, and preserving structures of other domain(s), such as the second deformation domain.

The structure preserving editing may be viewed as an optimization problem, where the goals may include maximizing one or more of the structural and/or local similarities between the domains (e.g., such as between the first deformation (rest) and second deformation domains), and/or satisfying any user input. In some embodiments, instead of applying direct solvers, the method may operate to design and/or use a multistage solver, such as by subsequently optimizing each type of free variable. This strategy may result in significant improvement in running time, and may not have a negative impact on the accuracy of the method.

In some embodiments, the number of repetitions of grid patterns may be allowed to change. In such cases, the method may operate to use a two-phase optimization strategy to identify an optimal repetition count of one or more of the grid patterns.

Some embodiments may use an affiliated deformation domain, which may have a similar, or substantially the same topology, as the first (e.g., rest_deformation domain. In such cases, the method may operate to first estimate the optimal region of each grid pattern by one or more rounds of optimization. Based on these optimal regions, the method may operate to determine optimal repetition counts and/or modify the second deformation domain and its mapping from the first deformation domain (e.g., the rest domain), accordingly. After that, the method may use a second round optimization to optimize the geometry of the second deformation domain.

The method described herein allows interactive editing of various vector arts and images. In some embodiments, the method may yield editing results comparable to or, in many instances, noticeably superior to previously published works.

The embodiments described herein may provide one or more of, but not limited to, the following:

- Preserving global structures such as symmetries and line features for realistic shape manipulation;
- A generalized embedded deformation framework for structure preserving editing;
- A decoupled optimization strategy for solving the structure preserving deformation where structure parameters are involved; and
- A two-stage approach to optimize the repetition counts of grid patterns.

The following description discusses various techniques for creating deformations of digital images.

Context-Aware Editing

Context aware editing has been addressed in grid based embedded deformation, i.e., by letting the feature objects deform rigidly or similarly and by using affine deformation to smoothly interpolate unimportant regions. These techniques usually can preserve the shape of features. Moreover, some global structures can also be preserved if they are aligned with the axis of the grid. However, one or more of grid representation and symmetry preservation may not be properly formulated and/or used. As a result, these techniques may not be able to preserve all desired partial symmetries and/or all desired structures under more general deformations such as warping the scenes.

In the computational photography research, a technique called Seam Carving can be used for image resizing by adaptively remove and/or add vertical and/or horizontal seams to generate the output image. However, Seam Carving also may not properly consider structure preservation. Image resizing techniques based on image patch transform may be able to achieve an effect of preserving regular structures such as removing a row of windows. However, image patch transform based techniques are usually very time-consuming because it solves a non-convex optimization problem and it is not clear how any desired symmetries are preserved.

Symmetric Deformation

Another set of techniques have been developed that may make approximately symmetric shapes more symmetric. For example, some techniques may focus on symmetric remeshing of 3-D shapes. Conceptually, it may be possible to apply these symmetrization techniques to symmetry preserving editing. For example, standard shape deformation techniques may be applied to deform the shape, and then these symmetrization methods may be applied to the result of the previous operation to make the shape more symmetric. However, this approach may converge very slowly, particularly when the symmetric deformation is large. In contrast, the embodiments described herein may use continuity of symmetric deformation in editing, which may result in a faster and/or more precise operation.

Procedural Modeling

The idea of removing and inserting objects in grid patterns is related to procedural modeling and texture synthesis, in which a seed object may be repeated many times to fill in the modeling domain. However, in these scenarios, the shapes of the seeds are usually fixed. The embodiments described herein may optimize both the number of repetitions and/or the shapes of seeds, and these optimizations may be performed simultaneously.

Structure Recovery

Another set of techniques (i.e., realistic structure preserving editing) may rely on robust structure recovery methods. In some embodiments, the method may operate as described below.

Generalized Embedded Deformation

In some embodiments, the method may first formulate the problem of structure preserving editing.

For example, FIG. 3 illustrates computation of an output scene from an input scene. The exemplary input scene may include a set of objects $S_i$; $1 \leq i \leq M_i$ in 2-D. In some embodiments, framework, the input scene may be embedded into the rest or first deformation domain, and the output scene may be embedded into the second deformation domain. As mentioned above, in some embodiments the method may use other domains and/or additional scenes. The first and second deformation domains may be linked by a set of correspondences (marked as C in FIG. 3). The output scene may be computed from the input scene, such as by using the embedding of the input scene and/or the correspondences between the graph in the first or rest deformation domain and the graph in the second deformation domain.

Depending on the type of input, each object may be a point, a triangle, a curve and/or an image patch. In some embodiments, the method may use additional types of objects, such as corners, squares, or any other type of an object. When the user manipulates the scene, such as by placing and dragging handles (or any by using any other manipulation means), the method may generate one or more sets of objects $S'_j$, $1 \leq j \leq M_O$ as the output scene, such that each $S'_j$ may be a deformed version of some $S_i$. Thus the method may operate to preserve any structures, such as line features and symmetries, of the input scene $\{S_i\}$ in the output scene $\{S'_j\}$.

FIG. 2A

FIG. 2A is an exemplary flowchart for a method for structure preserving editing using generalized embedded deformation, according to some embodiments. The method shown in FIG. 2A may be used in conjunction with embodiments of the computer system shown in FIG. 7, among other devices. In various embodiments, some of the method elements shown may be performed concurrently, in a different order than shown, or may be omitted. Additional method elements may also be performed as desired. Any of the method elements described may be performed automatically (i.e., without user intervention). As shown, this method may operate as follows.

First, in 202, an image may be received, where the image includes an input scene that includes one or more objects. In one embodiment, the image may include one or more global structures, including one or more symmetries, one or more grid patterns, and/or one or more line features. As noted above, line features may include line segments and/or vanishing points, and symmetries may be reflectional, rotational, and/or translational.

In 204, a distribution of pins may be associated with the input scene, where each pin is associated with a respective portion of the input scene, and where the associating operates to transform the image into a first deformation domain. Note that in some embodiments, the distribution of pins is or includes a non-regular distribution of pins associated with the input scene. In other embodiments, the distribution of pins may be or include a regular grid of pins associated with the input scene. As notes above, using a non-regular distribution may result in efficiencies due to omission of pins that are not germane to the structure of the scene, or, stated another way, due to increased density of pins in areas of interest/structure in the scene.

In 206, symmetry information regarding one or more symmetries among the one or more objects in the input scene may be received. The received symmetry information may include detected symmetries among the one or more objects in the input scene, and/or user input indicating at least one of the one or more objects in the input scene, e.g., where the user input may indicate one or more symmetries of or related to the objects in the input scene.

In 208, input to deform the input scene may be received. For example, a user may provide input via one or more graphical tools to deform or distort the input scene.

In 210, the input scene may be mapped from the first deformation domain into a second deformation domain in response to the input. The mapping may generate a corresponding output scene in the second deformation domain, and may operate to preserve the one or more symmetries.

In 212, structural similarities and local similarities between the first and the second deformation domains may be detected.

In 214, the output scene from the second deformation domain may be transformed into an output image while preserving both the structural and the local similarities. In other words, the output scene embedded in the second deformation domain may be transformed, thereby generating an output image, where the transformation preserves the detected structural and local similarities. In one embodiment, the transformation may include optimizing the structural similarities and local similarities with respect to or in accordance with the input (of 208). For example, the optimization may include optimizing running time and approximation accuracy of the transformation.

In one embodiment, the optimizing may be performed in multiple stages, i.e., may be or include multi-stage optimization, where each stage is directed to a respective type of free variable in the optimizing. Such multi-stage optimization is described in more detail below, as are details regarding other exemplary embodiments and techniques of the method.

FIG. 2B

FIG. 2B illustrates some embodiments of a generalized embedded deformation framework. The method may use two or more deformation domains, such as a first or rest deformation domain $D_r$ and a second deformation domain $D_d$. In some embodiments, additional domains, e.g., additional deformation domains, may be used in addition to, or instead of, the first or rest deformation domain and the second deformation domain. As FIG. 2B shows, in this example the input scene is embedded into a first or rest deformation domain, while the output scene is embedded in the second deformation domain. These two deformation domains may be related with each other by a set of vertex correspondences. For example, the vertex correspondences may be grouped into overlapping chart correspondences.

In some embodiments, the objects in the output scene may be computed from one or more of any embeddings and transformations that may be associated with these chart correspondences. Thus the process of preserving structures between the input and the output scenes may be converted into a process of preserving structures between the first or rest deformation domain and the second deformation domain (and/or additional domains). The method may also allow inserting and removing objects by allowing one-to-many mapping in vertex correspondences, as explained below.

Deformation Domain

As FIG. 2B illustrates, a deformation domain may be defined by a set of vertices. The vertices of the deformation domains (e.g., the first or rest deformation domain and the second deformation domain) may be denoted as $V_r=(p_1, \ldots, p_m)$ and $V_d=(q_1, \ldots, q_n)$, respectively.

The deformation domains (e.g., the first deformation domain and the second deformation domain) may be related by n vertex correspondences $\{c_i\}$ where $1 \leq i \leq n$. For example, each vertex correspondence $c_i=(p'_i, q_i)$ may link a vertex $p_i$ from the first (rest) deformation domain and a vertex $q_i$ from the second deformation domain; but as mentioned above, other domains and thus vertex correspondences may be used instead, or in addition to, the examples given herein. The method may allow inserting and/or removing one or more objects, and as a result, a vertex $p'_i$ in the first deformation domain (e.g., the rest deformation domain) can have anywhere from zero to many corresponding vertices in the second deformation domain. To distinguish these vertex correspondences, the method may associate a vertex correspondence with a rank $r(c_i) \in Z^+$. In some embodiments, other ranking systems are contemplated.

The method may operate to maintain N chart correspondences $C_i$ where $1 \leq i \leq n$. Each chart correspondence $C_i=\{c_i\}$, $1 \leq i \leq n$ may group or specify a set of vertex correspondences. With each $C_i$, a center vertex correspondence may be found and/or used. The method may set or specify this center vertex correspondence to be $c_{i1}$. The rank of this chart correspondence $r(C_1)=r(c_{i1})$ may indicate the rank of its center vertex correspondence. For the purposes of this explanation, the set of vertices $\{p'_{ij}\}$ and the set of vertices $\{q'_{ij}\}$ are in the first and second deformation domains respectively.

In some embodiments, the method may associate each correspondence $C_i$ with a transformation $R_i$. Similar to many context-aware deformation techniques, the method may allow each transformation $R_i$ to range from affine transformations, similarity transformations to rotations, and/or other transformations. However, instead of making hard assignments, the method may use soft assignments by decomposing or considering each $R_i$ as a linear combination of an affine transformation $R_i^1 T_1$, a similarity transformation $R_i^2 \in T_2$ and/or a rotation $R_i^3 \in T_3$:

$$R_i = \sum_{k=1}^{3} \lambda_{ik} R_i^k$$

Thus the weights $\lambda_{ik}$ where $$\sum_{k=1}^{3} \lambda_{ik} = 1$$

can be understood as the coordinates of $R_i$ in each type of transformation. In some embodiments, using soft assignment may be more consistent with building correspondences from a saliency map of a scene than hard assignment. Specifically, for each $R_{ik}$, the method may be consistent with the vertex positions in terms of transforming $p_{i_j}'-p_{i_1}'$ to $q_{i_j}-q_{i_1}$:

$q_{i_j}-q_{i_1}=R_j^k(p_{i_j}-p_{i_1}), 2 \leq j \leq n_i$.

In some situations, not all of these equalities may be satisfied, and thus the method may calculate $R_{ik}$ using the least-square technique by minimizing the following.

$$e_{ik} = \sum_{j=2}^{n_i} \|R_i^k(p_{i_j}' - p_{i_1}') - (q_{i_j} - q_{i_1})\|^2. \quad (3)$$

Minimizing $e_{ik}$ may be also called shape matching. In some embodiments, the optimal $R_{ki}$; may be computed explicitly.

Given $R_i$, the affine map $\mathcal{T}_i(\cdot): \mathcal{R}^2 \to \mathcal{R}^2$ of $C_i$ may be found by calculating the following:

$(\mathcal{T}_i(x)=R_i(x-p_{i_1}')+q_{i_1}$  (4)

Embedding

The input scene may be embedded into a first deformation domain (e.g., the rest domain) by using terms of non-negative weights of the chart correspondences. For example, given a point x in the input scene, its coordinate with respect to the chart correspondence $C_i$ may be denoted as $w_{C_i}(x)$. For efficiency, the method may make the coordinates compactly supported such that $w_{C_i}(x)$ may be positive only for the neighboring chart correspondences $N(x)$ of x whose distances to x may be smaller than a user-selected value $r_{max}$. The distance between a chart correspondence $C_i$ with x may be defined as $\|p_i-x\|$. As we expect x to have bigger weights with closer chart correspondences, $w_{C_i}(x)$ may be defined as:

$w_{C_i}(x)=(1.0-\|x-p_{i_1}\|/r_{max})^2$.  (5)

The output scene may be generated by computing the images of each point x in the input scene using the concept of partition of unity. Each rank of the chart correspondences may produce a copy of a partial input scene. Given a rank l, the $l^{th}$ image of x may given by:

$$x_l = \mathcal{M}_l(x) = \sum_{r(C_i)=l} w_{C_i}(x) T_i(x) \bigg/ \sum_{r(C_i)=l} w_{C_i}(x). \quad (6)$$

The method may not compute $x_l$ if $$\sum_{r(C_i)=l} w_j(x) = 0,$$

e.g., in the case where none of the neighboring chart correspondences x rank l.

Summarizing one embodiment of the above, each of the first and second deformation domains may include a respective set of vertices, where the first and second deformation domains are related by one or more ranked chart correspondences. Each chart correspondence may include one or more ranked vertex correspondences between the respective sets of vertices, where the rank of a chart correspondence is or includes the rank of a center vertex correspondence. Each chart correspondence may be associated with a respective transformation. The input scene may be embedded in the first deformation domain in accordance with respective non-negative weights of the ranked chart correspondences, and the output scene may be generated by computing vertices in the output scene corresponding to vertices in the input scene based on partition of unity in accordance with the ranks of the chart correspondences and their corresponding transformations. Note that each vertex correspondence may be or include a zero to one correspondence, a one to one correspondence, or a one to many correspondence.

Structure Preservation

In some embodiments, structure preserving may operate to embed one or more structures when constructing the first deformation (e.g., rest) domain, and require these structures to be preserved in the second deformation domain. The preservation of symmetries may operate as follows. For an exemplary symmetric transformation $A_1$, $b_1$ may map a region $O_1$ to a region $O_2$ in the input scene. In this exemplary transformation, the method may build the first (e.g., rest) deformation domain such that the vertices and charts in $O_1$ are also mapped with their corresponding vertices and charts in $O_2$. The method may consider the $l^{th}$ regions $M_1(O_1)$ and $M_1(O_2)$ of $O_1$ and $O_2$ in the output scene. If the linked vertices in $M_1(O_1)$ and $M_1(O_2)$, inherited from the linked vertices in $O_1$ and $O_2$, are constrained and also related by another symmetric transformation $A_2$, $b_2$, then the following theorem can be proved:

Theorem 3.1—The $l^{th}$ image of is obtained from $l^{th}$ image of $x \in O_1$ under the same symmetric transformation:

$x_i'=A_2 x_1+b_2$,  (2)

given that the neighboring charts of x and x' are contained in $O_1$ and $O_2$, respectively. The proof is listed below.

As distances are preserved by symmetric transformation, for every chart correspondence $C_i \in O_1$ and each of its corresponding chart $C_j \in O_1$ there may be:

$w_{C_j}(x')=w_{C_i}(x)$.  (23)

Secondly, it may be proven that the transformation Rj may be related to the transformation Ri by:

$R_j=A_2 R_i^k A_1^{-1}$  (24)

It may be sufficient to show that $R_j^k=A_2 R_i^k A_1^{-1}$, as well as the following:

$$R_j^k = \arg\min_{R \in \mathcal{T}_k} \sum_{s=2}^{n_j} \|(q_{j_s} - q_{j_t}) - R(p_{j_s}' - p_{j_1}')\|^2 = \quad (25)$$

$$\arg\min_{R \in \mathcal{T}_k} \sum_{s=2}^{n_j} \|A_2(q_{i_s} - q_{i_1}) - RA_1(p_{i_s}' - p_{i_1}')\|^2 =$$

$$\arg\min_{R \in \mathcal{T}_k} \sum_{s=2}^{n_j} \|(q_{i_j} - q_{i_1}) - A_2^{-1} RA_1(p_{i_s}' - p_{i_1}')\|^2.$$

Thus the following may obtain:

$$A_2^{-1} R_j^k A_1 = R_i^k \rightarrow R_j^k = A_2 R_i^k A_1^{-1}. \quad (26)$$

Using equations 23 and 24:

$$\sum_{r(C_j)=l} w_{C_j}(x') x'_l = \sum_{r(C_j)=l} w_{C_j}(x')(R_j(x' - p_{j'_1}) + q_{j_1}) = \quad (27)$$

$$\sum_{r(C_i)=l} w_{C_i}(x)(A_2 \circ R_i \circ A_1^{-1} A_1(x - p_{i'_1}) + A_2 q_{i_1} + b_2) =$$

$$\sum_{r(C_i)=l} w_{C_i}(x)(A_2(R_i(x - p_{i'_1}) + q_{i_1}) + b_2) = A_2 \sum_{r(C_i)=l} w_{C_i}(x)\mathcal{T}_i +$$

$$\sum_{r(C_i)=l} w_{C_i}(x) b_2 = \sum_{r(C_j)=l} w_{C_j}(x')(A_2 x_l + T_2).$$

QED.

Similarly, a line feature L can be preserved by placing consecutive samples $q_{i_k}^t$ on L and constraining their corresponding samples $q_{i_k}^t$ of each rank l to also lie on a line. In some embodiments, this approach may only preserve lines approximately because of the following relationship:

$$T^1(p_{i_k}) \approx q_{i_k}.$$

In some embodiments, to have (substantially) exact preservation, the method may use triangle correspondences and/or chart correspondences, and generate the output scene by using Barycentric coordinates (i.e., a specialized coordinate system used to describe triangles using x, y, and z coordinates. In some embodiments the output scene may be generated using different coordinate systems, such as Areals and/or Orthogonal Trilenears, among others.

However, these two strategies may generate similar results visually. In some cases such as warping the scene, it may make sense to only preserve the structures approximately. To approximately preserve the structures, the structure constraints may be only be satisfied in the least square sense (as discussed in the optimization section)

Initialization

The goal of initialization is to construct a first (e.g., rest) deformation domain in which the structures in the input scene are embedded.

Structure Recovery

The method may use existing structure recovery methods to detect the structures for preservation. These techniques include techniques for preserving symmetries and grid patterns, as well line features and vanishing points, as described herein. From structure recovery, we obtain a set of structures each of which is given by a set of parameters and within which domain this structure happens.

In some embodiments, some of the structure recovery algorithms may suffer from instabilities and inefficiency due to uncertainty in the size of input. In such cases, the method may allow a user to manually correct the detected structures or select the part of region for structure. In some embodiments the corrections are implemented automatically by the method, i.e. after detecting any instability and inefficiency due to the uncertainty, the size of input, and/or other factors. In some embodiments the method may present or more suggestions to the user after detecting any instability and inefficiencies, and the user may select one of the suggestions or manually override the suggestions and input own recommendation. Thus the method may allow the user to manually correct the detected structures or select the part of region for structure detection. Since structure recovery is not the major focus of this paper, the details are omitted here.

Structure Aware Embedding

In some embodiments, the first (e.g., rest) deformation domain may be set as a bounding box of the input scene. The method may use a sampling based technique to construct the first deformation domain in which its vertices and correspondences are built in order.

Vertex

In some embodiments, for one or more grid patterns in the input scene, the method may insert of grid of vertices and treat its four boundary line segments are line features. The method may then sample line features, e.g., by placing samples on them. Finally, the method may place sample to fill most or all of the remaining regions. To account for symmetries, for each of the most or all of newly inserted samples, the method may duplicate it by the symmetric structures when it conforms to some pre-selected criteria (e.g., such as if it lies in the domain of these structures). In some embodiments, the vertices associated with each symmetry may be also stacked when duplicating samples with this structure.

In some embodiments, when the user inserts one or more handles, the method may also insert each handle as a handle vertex. To prevent from generate samples of high variance; the method may use a sampling density s to control the sampling process, although other ways to control the sampling process are contemplated. Line features may be sampled independently. For the other samples, the method may use stratified sampling with grid size s to maintain a queue of uniform samples and insert these pre-computed samples into the first (e.g., rest) deformation domain.

To further reduce variance, the method may discard a sample if during the process of inserting it or duplicating it the method gets a sample whose closed distance to existing samples is smaller than a predetermined value of s (e.g., s with a value of 3). In some embodiments, the method may not discard a sample regardless of whether a closed distance to existing samples is smaller than a predetermined value of s.

Correspondence

In some embodiments, the second deformation domain may be initialized similarly to that of the first deformation domain. The vertex correspondences may be initialized by linking each pair of vertices. The chart correspondences may be computed by computing the k-nearest neighbors (such as with an exemplary k=15, but other values are possible). Each vertex with its k-nearest neighbor may form a chart with the vertex being the center vertex of this chart. In some embodiments, the method may remove a chart correspondence if its center vertex in the first deformation domain lies on the boundary of the grid pattern or it is a handle vertex. Moreover, the method may shrink the chart correspondences such as the domain of each chart correspondence does not across the boundaries of grid patterns. Thus the method may operate to make the deformation domains consistent during the removal/insertion of vertices in the grid patterns of the second deformation domain.

The coordinates $\lambda_{jk}$ of each correspondence $C_i$ may be determined by estimating its transformation type. For vector arts, the method may operate to let the charts in which objects are overlayed transform rigidly and set $\lambda_{j1}=1.0$, and let charts whose center vertices lie on empty regions to undergo affine transformation, e.g., set $\lambda_{j3}$. The method may operate to use Laplacian smoothing to smooth the each type coordinate on the k-nearest neighbor graph such that they do not change drastically between neighboring correspondences, although other smoothing algorithms are contemplated, such as a Bilaplacian smoothing.

For natural images, the method may use the saliency map based on image gradients. In some embodiments, charts with high saliency may be constrained to rigid transformation by setting $\lambda_{j1}=\lambda$ where $\lambda$ may be the ratio between the averaged saliency of chart with respect to the maximum saliency. The affine transformation coordinate may be set $\lambda_{j3}=1-\lambda$. In both cases, the method may also allow to user to choose whether to allow charts transform similarly to that described above instead of rigidly.

Optimization

In some embodiments, once the deformation domains have been specified, the method may operate to receive user input manipulating the scene by placing and moving handles around. The geometry and topology of the second deformation domain may comprise the unknowns which may be obtained by solving a constrained optimization problem. The objective function may collect handle, shape and structural energy terms, among others. The handle energy term may specify the user input. The shape energy term may describe the consistency of each correspondence. The structure energy term may represent the structures that are preserved approximately. The other structures which may be preserved exactly may be formulated as equality constraints. In summary, the optimization problem may be formulated as:

$$\min_{\mathcal{D}_d} w_h E_h + w_d E_d + w_s E_s \quad (8)$$

$$\text{subject to } F_s(\mathcal{D}_d) = 0.$$

In the equation (8) above, $E_h$, $E_d$, and $E_s$ may represent the handle, shape and structure energy terms, and $w_h$, $w_d$, and $w_s$ may describe the tradeoffs among them. The equality constraints may be encapsulated by $F_s(D_d)=0$. In other words, the optimizing may include minimizing energy, including minimizing a weighted sum of handle energy, shape energy, and structure energy, subject to handle constraints and/or fixed constraints. Discussion on how to optimize the repetition counts is described below. The following section describes how to solve Equation 8 with the topology of the second deformation domain being fixed.

Problem Formulation

The method may first give a formulation of each type of energy terms and present the formal formulation at the end of this section.

Handle

Similar to most of the surface deformation techniques, the method may use two types of constraints: handle constraints and fixed constraints. In some embodiments, other constraints may be used in addition to/instead of, the ones listed above. Handle constraints may be formulated as minimization the distances between the handle vertices and their target positions:

$$E_C = \sum_{l=1}^{L} \|q_{h_l} - h_l\|_2^2. \quad (9)$$

Where hl may be the index of $l^{th}$ handle vertex and hl may be its target position. In addition to the handle constraints, the user may also specify fixed constraints as $q_{f_i} c_i$, $1 \leq i \leq |\mathcal{P}|$, where fi may be the index of a fixed vertex and ci may be the fixed position of vertex $q_{fi}$. The matrix representation of the fixed constraints may be given by:

$$Fq=c \quad (10)$$

Where $q=(q_1, \ldots, q_N)$ may stacks all the deforming vertex positions.

$$F=(e_{f_1}, \ldots, e_{f_{|\mathcal{F}|}})^T \otimes I_2$$

and $e_i$ may be the $i^{th}$ row of the identity matrix IN:

$$I_N, c=(c_1^T, \ldots, c_{|\mathcal{F}|}^T)$$

Shape

The value of the energy function defined in Equ. 3 may naturally describe the consistency of the correspondence $C_i$. Thus, the method may define the shape term for correspondence $C_i$ as:

$$S(C_1) = \sum_{k=1}^{3} \lambda_{ik} \sum_{j=2}^{n_i} \|(q_{i_j} - q_{i_1}) - R_i^k(p_{i'_j} - p_{i'_1})\|^2. \quad (11)$$

Here, the method may treat $R_i^k$ as latent variables and optimize them together with the vertex positions. It is possible to write down $S(C_i)$ solely in terms of q by optimizing each $R_i^k$ first.

The total shape energy term may be then defined as the summation of all the correspondence shape terms:

$$E_d = \sum_{i=1}^{N} S_r(C_i). \quad (12)$$

Structure

FIG. 4 presents a variety of exemplary structures that the method may preserve; note that the list is for explanation only and other structures may be preserved by the method described herein. Each structure $S_k$ may constrain on a subset of the vertex positions $\{q\}$. To ease the discussion, only a unified formulation is presented here, and a detailed formulation is shown at the end of this description. The constraints specified by structure $S_k$ may be formulate as:

$$D_k q = P_k(\Phi_k) t_k. \quad (13)$$

where $t_k$ and $\Phi_k$ may be the linear and the non-linear parameters of $S_k$, respectively. $P_k$ and $D_k$ may be matrices, where $P_k$ may be parameterized by $\Phi_k$ and $D_k$ may be a constant matrix.

In some embodiments, for each structure $S_k$ where $k \in A$ where A collects the indices of the structures to be preserved approximately, the method may penalize the deviation of Equ. 13 in L2-norm. In some embodiments, the method may use a different penalization and/or not penalize at all. The total structure energy term is given by:

$$E_s = \sum_{k \in A} w_k \|D_k q - P_k(\Theta_k) t_k\|_2^2. \quad (14)$$

where wk may represent the importance of structure Sk. The method may use a default value for $w_k$, such as $w_k=0.5$, but other values are contemplated. In some embodiments, for each other structures $S_k$ where $k \in K/A$, the method may add Equ. 13 as constraints to the optimization problem.

Formulation

Substituting Equ. 9, Equ. 10, Equ. 12, Equ. 13 and Equ. 14 into Equ. 8, the below describes a more detailed formulation of the optimization problem, according to one embodiment. Thus the method may operate to minimize:

$$F(q, \{R_j^k\}, \{t_k\}, \{\Theta_k\}) = w_h \sum_{l=1}^{L} \|q_{h_l} - h_l\|_2^2 + \quad (15)$$

$$w_d \sum_{i=1}^{N} \sum_{k=1}^{3} \lambda_{ik} \sum_{j=2}^{n_i} \|(q_{i_j} - q_{i_1}) - R_i^k(p_{i'_j} - p_{i'_1})\|^2 +$$

$$w_s \sum_{k \in \mathcal{A}} w_k \|D_k q - P_k(\Theta_k) t_k\|_2^2,$$

subject to $D_q = b$ (Equ. 16), where D and b encapsulate the left and right hand sides in Equ. 10 and Equ. 13.

In order to make this optimization well-defined, the matrix D may be full-ranked. In some embodiments, in presence intervened structures, the method may release some exact preserved structures. For example, the method may start from $D = F^T$ and incrementally add $D_k^T$ to D, keeping D full-ranked. In other embodiments, other strategies for releasing some exact preserved structures may be used instead.

Numerical Optimization

As the unknowns comprise variables of different scales and types and there may be non-linear parameters in the constraints, the method may optimize each type of free variables subsequently using one or more of three stages, attempting to find the best tradeoff between running time and approximation accuracy. Thus in some embodiments, all three stages may be used, although two or even one stage of the following optimization may be used as needed.

In stage I, the method may optimize the non-linear structure parameters $\{\Phi_k\}$ and treat linear structure parameters $\{t_k\}$, vertex positions q and transformations $\{R_j^k\}$ as latent variables. As $\{\Phi_k\}$ typically consist of global parameters such asl directions of reflectional axis, the method may only use coarse deformation domains and consider preserving structures approximately, however other use of deformation domains is contemplated. In some embodiments, a Gauss-Newton method may be employed at this stage (which usually runs very efficiently for small scale problems). In some embodiments, other algorithms may be used, such as a quasi-Newton method, among others.

In stage II, once the non-linear structures $\{\Phi_k\}$ are computed, the method may move on to optimize the linear structure parameters $\{t_k\}$. In this stage, the vertex positions q and transformations $\{R_j^k\}$ may be latent variables, although use of other latent variables is contemplated. The method may preserve most or all of the structures approximately.

In stage III, the method may fix the structure parameters to optimize the vertex positions and transformations. At this stage, exactly preserved structures may be recovered. In both stage II and stage III, the method may use variants of the alternating optimization method, such as ones that may be used for larger scale problems.

Stage I: Optimize Q.

In stage I, the method may parameterize most or all of the unknowns to apply numerical optimization techniques. The vertex positions q, the linear and non-linear parameters $\{t_k\}$ and $\{\Phi_k\}$ may be parameterized trivially. Each affine transformation $R_j^1$, similarity transformation $R_j^2$ and rotation $R_j^3$ are parameterized as follows:

$$R_j^1 = \begin{pmatrix} \phi_{j1}^1 & \phi_{j1}^2 \\ \phi_{j1}^3 & \phi_{j1}^4 \end{pmatrix}, R_j^2 = \begin{pmatrix} \phi_{j2}^1 & \phi_{j2}^2 \\ \phi_{j2}^2 & \phi_{j2}^1 \end{pmatrix}, \quad (17)$$

$$R_j^3 = \begin{pmatrix} \cos\phi_{j3}^1 & -\sin\phi_{j3}^1 \\ \sin\phi_{j3}^1 & \cos\phi_{j3}^1 \end{pmatrix}$$

The method may use a vector $x = q, \{\Phi_{jk}^1\}, \{t_k\}, \{\Phi_k\})$ to stack all the free variables. As the objective function consists of nonlinear least squares, the method may use it as $f(x)^T f(x) = F(x)$ where $f(x)$ may be an array of functions. Each Gauss-Newton iteration may improve the current values of the free variables as $x_{k+1} = x_k + d_k$ by solving:

$$d_k = \arg\min_d \|f(x_k) + \nabla f(x_k) d\|^2 \quad (18)$$

$$Fd_k = 0.$$

Where $\nabla f(x_k)$ may be the Jacobian of $f(x)$ at $x_k$. Using lagrangian multiplier, $d_k$ may be obtained by solving:

$$\begin{pmatrix} \nabla f^T \nabla f & F^T \\ F & 0 \end{pmatrix} \begin{pmatrix} d_k \\ \lambda \end{pmatrix} = \begin{pmatrix} \nabla f^T f \\ 0 \end{pmatrix}. \quad (19)$$

Stages II and III: Optimize q and t.

When the non-linear structure parameters $\Phi$ are fixed, the method may use an alternating subset technique to optimize q, t and $\{R_j^k\}$. At each iteration, the method may first optimize the local transformations $\{R_j^k\}$ and linear structure parameters t with the vertex positions q being fixed.

Note that when q is fixed, all the local transformations $R_j^k$ and all the linear parameters may be decoupled. Thus, the method may optimize them independently. Optimizing each local transformation $R_j^k$ has been discussed above. For each structure $S_k$, its optimal linear parameter vector may be attained at $t_k^* = (P_k^T P_k)^{-1}(P_k^T D_k)$. By solving this least-square problem, the closed-form of $t_k^*$ may be given by:

$$t_k^* = (P_k^T P_k)^{-1}(P_k^T D_k) \quad (20)$$

When t, Q and $\{R_j^k\}$ are fixed, the objective function $F(q, \{R_j^k\}, t, \Phi)$ may be quadratic in q and the constraints may also be linear in q. Thus, the optimal vertex positions $q^*$ may be obtained by solving a linearly constrained quadratic programming problem:

$$\min_q q^T \nabla_{qq}^2 F q - 2\nabla_q F^T q \quad (21)$$

subject to $Dq = c$.

where $\nabla_{qq}^2 F$ and $\nabla_q F$ may be the Hessian and gradient of F with respect to q. Using Lagrangian multiplier, the optimal vertex positions $q^*$ may be computed by solving:

$$\begin{pmatrix} \nabla_{qq}^2 F & D^T \\ D & 0 \end{pmatrix} \begin{pmatrix} q^* \\ \lambda \end{pmatrix} = \begin{pmatrix} \nabla_q F \\ c \end{pmatrix}. \quad (22)$$

The method may employ some known techniques to solve both linear systems in Equ. 19 and Equ. 22. As can be seen from Equ. 15, the Hessian matrix $\nabla_{qq}^2 f$ may only depend on the topology of the correspondences and $\{D_k\}$. Thus the method may pre-factorize the matrix and use back-substitution for solving the linear system. As a result, the computational time and/or memory space cost per each iteration may be significantly reduced. Thus the above discussion refers to optimizing the geometry of the second deformation domain, where the configuration of the first and second deformation domains may be fixed.

Thus, summarizing one embodiment of the above, the optimization may be performed in multiple stages, including performing a first stage, including optimizing non-linear structure parameters while treating linear structure parameters, vertex positions, and transformations as latent variables, performing a second stage, including optimizing linear structure parameters with fixed non-linear structure parameters, while treating vertex positions and transformations as latent variables, and performing a third stage, including optimizing vertex positions and transformations with fixed structure parameters. Additionally, in some embodiments, optimizing non-linear structure parameters may include alternating between optimizing vertex positions, and optimizing rotations and structure parameters. Similarly, optimizing linear structure parameters with fixed non-linear structure parameters may include alternating between optimizing vertex positions, releasing exact structure constraints, and optimizing rotations and linear structure parameters. Finally, optimizing vertex positions and transformations with fixed structure parameters may include alternating between optimizing vertex positions, and optimizing rotations and linear structure parameters.

In some embodiments, the method may optimize the number of repetitions of repeated patterns. Without losing any generality, one of the goals of the method described herein may be to preserve the size of the grid cell. For example, in one embodiment, optimizing repetition counts of grid patterns in the image may include estimating respective optimal regions of each grid pattern via one or more rounds of optimization, and determining optimal repetition counts and/or modifying the second deformation domain and its mapping from the first deformation domain, using the estimated respective optimal regions of each grid pattern.

FIG. 6 illustrates an exemplary pipeline, according to some embodiments. As mentioned above, the method may operate to first estimate an optimal region of S1, such as by introducing an affiliated second deformation domain $\mathcal{D}d$. The second deformation domain $\mathcal{D}d$ may have the same, or very similar, topology of vertices and charts as the first deformation domain $D_r$. In some embodiments, the only difference between $\mathcal{D}d$ and $D_r$ may be some or all of the vertex positions which are under optimization. The structural constraints on $\mathcal{D}d$ may be copied from $D_d$.

However, in some embodiments, most or even all the correspondences within S1 may be allowed to be deformed affinely. As a rough estimation of the optimal repeated pattern regions may suffice in this case, the method may solve the optimization problem using at the coarse scale using Gauss-Newton method (or a related technique). FIGS. 6A-D illustrate an example of optimizing a repetition count of a grid pattern using the method described herein. FIG. 6A shows an exemplary original pattern. FIG. 6B shows an exemplary estimated region after deformation. FIG. 6C shows an exemplary second deformation domain with an optimized repetition count. FIG. 6D shows an exemplary optimized pattern, according to some embodiments.

After estimating the optimal region, the method may determine its best repetition count. Suppose the size of the optimal region is $s_k^X \times s_k^Y$ and the size of its seed may be $s_1^x \times s_1^y$, then the target repetition count may be $(s_1^x/d_1^x) \times (s_1^y/d_1^y)$.

To prevent from changing the topology back and forth so frequently, the method may update the current repetition count of $r_1^x \times r_1^y$ by $[s_1^x/d_1^x] \times [s_1^y/d_1^y]$ if $|s_1^x/d_1^x - r_1^x| > 0.75$ or $|s_1^y/d_1^y - r_1^y| > 0.75$, which may use a function that returns the closest integer of a float value. If the repetition count of $S_1$ has been updated, its region in the second deformation domain may be modified by copying the seed cell of $S_1$ by $r_1^x \times r_1^y$. Then for every chart in cell $c_{ij}^r \in \mathcal{D}^r$ of the first (e.g., rest) deformation domain, the method may build a correspondence with its corresponding chart in each cell $c_{i+kr_1^x, j+lr_1^y} \in \mathcal{D}^d$. The rank of this correspondence may be given by kmy+1 where my may be the multiplicity of $S_1$ in y-direction.

Results

Thus the method described herein may implement a structure preserving editing for various examples of vector arts and images.

Symmetry Preserving Editing

As illustrated in FIG. 5, the first example shows using the method to edit vector art which has a reflectional symmetry. In this example, reflectional symmetry is chopped into eight segments, where each segment is preserved approximately. The difference between preserving the symmetry and without preserving the symmetry is illustrated in FIG. 5B and FIG. 5C. As we can see in the figures, preserving the reflectional symmetries may ensure more realistic looking results.

FIGS. 1A-D illustrate an example where the method may detect two reflectional symmetries, three rotational symmetries and a repeated pattern. Specifically, FIGS. 1A-D illustrate examples of stretching vector art that has rich symmetry information. FIG. 1A shows an exemplary input image. FIG. 1B shows an output of a stretching operation using Uniform Scaling. FIG. 1C shows an output of a stretching operation using Symmetry Preserving Scaling, where the output image shows that stretching a vector art that has rich symmetry information. Symmetry preserving scaling yields more realistic results than uniform scaling. FIG. 1D shows an output of a stretching operation using an Optimized Repetition Count. Thus in this example, all the symmetries may be preserved exactly. As shown in FIG. 1B and FIG. 1C, the method may be able to find that preserving these symmetries is essential. In addition, as shown in FIG. 1D, the method may also optimize the repetition count to preserve the shape of the seed of the pattern.

The method described herein may be applied to handle vector arts of multiple layers. In other words, the generalized embedding deformation may be applied to the vector art at each layer, e.g., to a foreground layer and background layer.

Images

When deforming a natural image, it maybe important to preserve the line features and repeated content in that image, e.g., when stretching the image. Preserving feature regions may be achieved using seam carving techniques; however, such techniques may not be able to also preserve line features (and thus may result in unacceptable visual artifacts). Compared with results obtained using uniform scaling (where the line features are preserved), embodiments of the present method can also preserve feature regions such as people represented in the image. In other words, embodiments of the techniques disclosed herein may preserve both line features and feature regions, e.g., people.

CONCLUSION

Thus the methods described herein operate to allow structure-preserving editing using a generalized embedding deformation framework. The input and output scenes may be related to each other by a pair of deformation domains in which they are embedded. Structure preserving editing may be formulated as an optimization problem which is solved for both maximizing the structural similarity and local similarity between the deformation domains, and meeting requirements of user input. The method may be operable to achieve real-time performance. The method may also optimize their repetition count during editing. Finally, the effectiveness of our framework is demonstrated by various editing tasks regarding vector arts and natural images.

The method described herein may also consider other advanced constraints, such as that most or even all of the objects in the output scene should be collision free. Otherwise this operation may result in artifacts when stretching images drastically. The method may adjust the transformation weights of each correspondence adaptively such that the artifacts are minimized or even eliminated.

Thus the method operates to preserve global structures during editing. Although the method(s) described herein was described with respect to 2D examples, the method can be easily used to handle 3D objects. Moreover, the method can use a grid pattern as well as patterns specified by other symmetry groups, including more general patterns such as, for example, those created via an L-system.

Further Details:

Structure Energy Terms

In this section, various structure constraints are formulated into the form describe by Equ. 13.

Reflection Symmetry

Suppose a reflectional symmetry Sk has n pairs of reflectional symmetric vertices $(q_{2i-1}, q_{2i})$ where $1 \leq i \leq n$. The reflectional axis may be parameterized by its normal direction $n(\theta)=(\cos \theta; \sin \theta)$ and the projected distance d from the origin. Each pair of vertices may be parameterized by 2 scalars:

$$q_{2i-1}=n(\theta)(d-t_{2i})+n^{\perp}(\theta)t_{2i-1}$$

$$q_{2i}=n(\theta)(d-t_{2i})+n^{\perp}(\theta)t_{2i-1}. \quad (28)$$

Translational Symmetry

A translational symmetry where $p_{ij}$ may be the sample point of this translational symmetry and d may be the spacing of this translational symmetry. The translational symmetry in one direction may be parameterized as:

$$q_{ij}-q_{i_0}=jd \quad (29)$$

Rotational Symmetry

Where o is the rotation center and $\theta$ is a rotation angle. The rotational symmetry may be parameterized as $$q_{ij} = o + \begin{pmatrix} \cos(j-1)\theta & -\sin(j-1)\theta \\ \sin(j-1)\theta & \cos(j-1)\theta \end{pmatrix} d_i. \quad (30)$$

In this case, $\theta$ may be the unique non-linear parameter and $d_i$ are the linear parameters.

Line Segment

For a structure S that has L sets of vertices $\{q_{ij}\}$ where $1 \leq i \leq n_i$. Each set of vertices may lie on a line and all of these lines may meet a point. We parameterize these points by first choosing the point o. Then each line may be parameterized by its normal direction $n(\theta_i)$. Finally each vertex may be defined by a scalar $t_{ij}$:

$$q_{ij}=n(\theta)d_i+n^{\perp}(\theta)t_{ij}. \quad (31)$$

Vanishing Point

A vanishing point structure Sk may contain L sets of colinear vertices $\{q_{ij}\}$ where $1 \leq i \leq L$, $1 \leq j \leq m_i$ whose corresponding lines Li share at a single point o. These points may be parameterized as $$q_{ij}=o+n(\theta_i)t_{ij}, 1 \leq j \leq m_i. \quad (32)$$

where $n(\theta_i)$ may be the normal direction to the line Li.

Fixed Angle

A fixed angle structure Sk may consists of four points $q_{k_i}$, $1 \leq i \leq 4$, where the angle between the vector $q_{k_2}-q_{k_1}$ and the vector $q_{k_4}-q_{k_3}$ may be fixed at $\alpha_k$. This constraint may be parameterized as:

$$q_{k_2}-q_{k_1}=n(\theta_k)t_{k_1}, q_{k_4}q_{k_3}=n(\theta_k+\alpha_k)t_{k_2}, \quad (33)$$

Exemplary System

Figure 7:
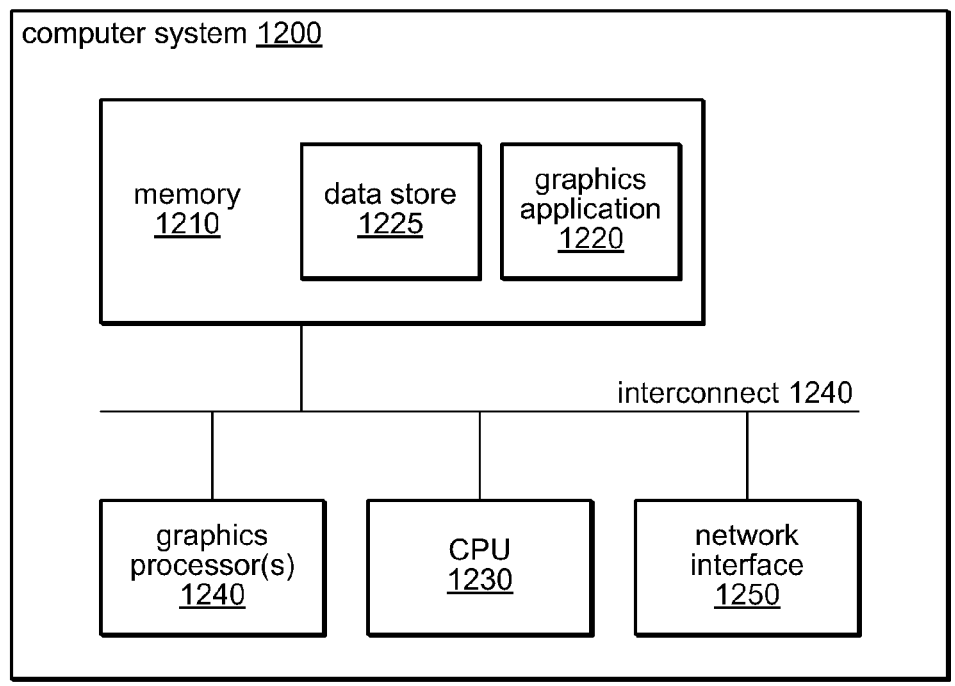
FIG. 7 illustrates an exemplary computer system that may be used in some embodiments.

The methods described herein for structure preserving editing using generalized embedded deformation may be implemented by a computer system configured to provide the functionality described. FIG. 7 is a block diagram illustrating one embodiment of a computer system 1200 suitable for implementing embodiments of a structure preserving editing using generalized embedded deformation. A graphics application such as graphics application 1220 may be configured to perform various image processing functions and to render new images accordingly. In some embodiments, a user may invoke operations to perform various functions as described for embodiments via a user interface of graphics application 1220. Graphics application 1220 may be configured to perform these operations using the methods described herein for structure preserving deformations in digital images. Graphics application 1220 may, for example, be configured to render an output a result image using embodiments of the method described herein.

Graphics application 1220 may represent various types of graphics applications, such as painting, publishing, photography, games, animation, and other applications. Additionally, graphics application 1220 may utilize a graphics processor 1240 when rendering or displaying images according to various embodiments. A graphics processing unit or GPU may be considered a dedicated graphics-rendering device for a personal computer, workstation, game console or other computer system. Modern GPUs may be very efficient at manipulating and displaying computer graphics and their highly parallel structure may make them more effective than typical CPUs for a range of complex graphical algorithms. For example, graphics processor 1240 may implement a number of graphics primitive operations in a way that makes executing them much faster than drawing directly to the screen with a host central processing unit (CPU), such as CPU 1230. In various embodiments, the methods disclosed herein for may be implemented by program instructions configured for parallel execution on two or more such GPUs. The GPU 1200 may implement one or more application programmer interfaces (APIs) that permit programmers to invoke the functionality of the GPU. Suitable GPUs may be commercially available from vendors such as NVIDIA Corporation, ATI Technologies, and others.

Please note that functionality and/or features described herein as being part of, or performed by, graphics application 1220 may, in some embodiments, be part of, or performed by, one or more graphics processors, such as graphics processor 1240. As described above, in some embodiments graphics application 1220 may be configured to render modified and/or reconstructed images into a different window than input images.

The various functions described herein for embodiments of structure preserving editing using generalized embedded deformation may be implemented on various types of computer systems. Referring again to FIG. 7, computer system 1200 may be any of various types of devices, including, but not limited to, a personal computer system, desktop computer, laptop or notebook computer, mainframe computer system, handheld computer, workstation, network computer, a consumer device, video game console, handheld video game device, application server, storage device, a peripheral device such as a switch, modem, router, or in general any type of computing device.

Graphics application 1220, which may be configured to implement structure preserving editing using generalized embedded deformation as described herein, may be provided as a computer program product, or software, that may include a computer-readable storage medium having stored thereon instructions, which may be used to program a computer system (or other electronic devices) to implement computer graphics functions such as rendering synthetic images using the techniques described herein. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, or other types of signals or mediums).

As illustrated in FIG. 7, computer system 1200 may include one or more processor units (CPUs) 1230. Processors 1230 may be implemented using any desired architecture or chip set, such as the SPARC™ architecture, an x86-compatible architecture from Intel Corporation or Advanced Micro Devices, or another architecture or chipset capable of processing data, and may in various embodiments include multiple processors, a single threaded processor, a multi-threaded processor, a multi-core processor, or any other type of general-purpose or special-purpose processor. Any desired operating system(s) may be run on computer system 1200, such as various versions of Unix, Linux, Windows™ from Microsoft Corporation, MacOS™ from Apple Corporation, or any other operating system that enables the operation of software on a hardware platform.

The computer system 1200 may also include one or more system memories 1210 (e.g., one or more of cache, SRAM, DRAM, RDRAM, EDO RAM, DDR RAM, SDRAM, Rambus RAM, EEPROM, or other memory type), or other types of RAM or ROM) coupled to other components of computer system 1200 via interconnect 1260. Memory 1210 may include other types of memory as well, or combinations thereof. One or more of memories 1210 may include program instructions 1215 executable by one or more of processors 1230 to implement structure preserving editing using generalized embedded deformation as described herein. Program instructions 1215, which may include program instructions configured to implement graphics application 1220, may be partly or fully resident within the memory 1210 of computer system 1200 at any point in time. Alternatively, program instructions 1215 may be provided to GPU 1240 for performing various computer graphics operations (or portions thereof) on GPU 1240 using one or more of the techniques described herein.

In some embodiments, the techniques described herein may be implemented by a combination of program instructions 1215 executed on one or more processors 1230 and one or more GPUs 1240, respectively. Program instructions 1215 may also be stored on an external storage device (not shown) accessible by the processor(s) 1230 and/or GPU 1240, in some embodiments. Any of a variety of such storage devices may be used to store the program instructions 1215 in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage devices may be coupled to the processor(s) 1230 and/or GPU 1240 through one or more storage or I/O interfaces including, but not limited to, interconnect 1260 or network interface 1250, as described herein. In some embodiments, the program instructions 1215 may be provided to the computer system 1200 via any suitable computer-readable storage medium including memory 1210 and/or external storage devices described above. Memory 1210 may also be configured to implement one or more data structures 1225, such as one or more data structures for a method of structure preserving editing using generalized embedded deformation. Data structures 1225 may be accessible by processor(s) 1230 and/or GPU 1240 when executing graphics application 1220 or other program instructions 1215.

As shown in FIG. 7, processor(s) 1230 may be coupled to one or more of the other illustrated components by at least one communications bus, such as interconnect 1260 (e.g., a system bus, LDT, PCI, ISA, or other communication bus type), and a network interface 1250 (e.g., an ATM interface, an Ethernet interface, a Frame Relay interface, or other interface). The CPU 1230, the network interface 1250, and the memory 1210 may be coupled to the interconnect 1260. It should also be noted that one or more components of system 1200 might be located remotely and accessed via a network.

As noted above, in some embodiments, memory 1210 may include program instructions 1215, comprising program instructions configured to implement graphics application 1220, as described herein. Graphics application 1220 may be implemented in various embodiments using any desired programming language, scripting language, or combination of programming languages and/or scripting languages, e.g., C, C++, C#, Java™, Perl, etc. For example, in one embodiment, graphics application 1220 may be JAVA based, while in another embodiments, it may be implemented using the C or C++ programming languages.

In other embodiments, graphics application 1220 may be implemented using specific graphic languages specifically for developing programs executed by specialized graphics hardware, such as GPU 1240. In addition, graphics application 1220 may be embodied on memory specifically allocated for use by graphics processor(s) 1240, such as memory on a graphics board including graphics processor(s) 1240. Thus, memory 1210 may represent dedicated graphics memory as well as general-purpose system RAM, in various embodiments. Memory 1210 may in some embodiments also include a data store configured to store image data for one or more input images or other graphics information and/or output images, or other information for use in computer graphics such as environment maps and reflectance functions, in various embodiments. Other information not described herein may be included in memory 1210 and may be used to implement the methods described herein and/or other functionality of computer system 1200.

Network interface 1250 may be configured to enable computer system 1200 to communicate with other computers, systems or machines, such as across a network. Network interface 1250 may use standard communications technologies and/or protocols, and may utilize links using technologies such as Ethernet, 802.11, integrated services digital network (ISDN), digital subscriber line (DSL), and asynchronous transfer mode (ATM) as well as other communications technologies. Similarly, the networking protocols used on a network to which computer system 1200 is interconnected may include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP), among other network protocols.

The data exchanged over such a network by network interface 1250 may be represented using technologies, languages, and/or formats, such as the hypertext markup language (HTML), the extensible markup language (XML), and the simple object access protocol (SOAP) among other data representation technologies. Additionally, all or some of the links or data may be encrypted using any suitable encryption technologies, such as the secure sockets layer (SSL), Secure HTTP and/or virtual private networks (VPNs), the international data encryption standard (DES or IDEA), triple DES, Blowfish, RC2, RC4, RC5, RC6, as well as other data encryption standards and protocols. In other embodiments, custom and/or dedicated data communications, representation, and encryption technologies and/or protocols may be used instead of or in addition to, the particular ones described above.

GPUs, such as GPU 1240 may be implemented in a number of different physical forms. For example, GPU 1240 may take the form of a dedicated graphics card, an integrated graphics solution and/or a hybrid solution. GPU 1240 may interface with the motherboard by means of an expansion slot such as PCI Express Graphics or Accelerated Graphics Port (AGP) and thus may be replaced or upgraded with relative ease, assuming the motherboard is capable of supporting the upgrade. However, a dedicated GPU is not necessarily removable, nor does it necessarily interface the motherboard in a standard fashion. The term "dedicated" refers to the fact that hardware graphics solution may have RAM that is dedicated for graphics use, not to whether the graphics solution is removable or replaceable. Dedicated GPUs for portable computers may be interfaced through a non-standard and often proprietary slot due to size and weight constraints. Such ports may still be considered AGP or PCI express, even if they are not physically interchangeable with their counterparts. As illustrated in FIG. 7, memory 1210 may represent any of various types and arrangements of memory, including general-purpose system RAM and/or dedication graphics or video memory.

Integrated graphics solutions, or shared graphics solutions are graphics processors that utilize a portion of a computer's system RAM rather than dedicated graphics memory. For instance, modern desktop motherboards normally include an integrated graphics solution and have expansion slots available to add a dedicated graphics card later. As a GPU may be extremely memory intensive, an integrated solution finds itself competing for the already slow system RAM with the CPU as the integrated solution has no dedicated video memory. For instance, system RAM may experience a bandwidth between 2 GB/s and 8 GB/s, while most dedicated GPUs enjoy from 15 GB/s to 30 GB/s of bandwidth. Hybrid solutions may also share memory with the system memory, but may have a smaller amount of memory on-board than discrete or dedicated graphics cards to make up for the high latency of system RAM. Data communicated between the graphics processing unit 1240 and the rest of the computer system 1200 may travel through a graphics card slot or other interface, such as interconnect 1260 of FIG. 7.

Computer system 1200 may also include one or more additional I/O interfaces, such as interfaces for one or more user input devices 1270, or such devices may be coupled to computer system 1200 via network interface 1250. For example, computer system 1200 may include interfaces to a keyboard, a mouse or other cursor control device, a joystick, or other user input devices 1270, in various embodiments. Additionally, the computer system 1200 may include one or more displays (not shown), coupled to processors 1230 and/or other components via interconnect 1260 or network interface 1250. Such input/output devices may be configured to allow a user to interact with graphics application 1220 to request or invoke various computer graphics operations and/or to specify various parameters, thresholds, and/or other configurable options available to the user when performing computer graphics tasks while executing graphic application 1220. It will be apparent to those having ordinary skill in the art that computer system 1200 may also include numerous other elements not shown in FIG. 7.

Note that program instructions 1215 may be configured to implement a graphic application 1220 as a stand-alone application, or as a module of another graphics application or graphics library, in various embodiments. For example, in one embodiment program instructions 1215 may be configured to implement graphics applications such as painting, publishing, photography, games, animation, and/or other applications, and may be configured to render and/or edit synthetic images as part of one or more of these graphics applications. In another embodiment, program instructions 1215 may be configured to implement the techniques of various embodiments as described herein in one or more functions called by another graphics application executed on GPU 1240 and/or processor(s) 1230. Program instructions 1215 may also be configured to render images and present them on one or more displays as the output of an computer graphics operation and/or to store image data for synthesized, modified and/or reconstructed images in memory 1210 and/or an external storage device(s), in various embodiments. For example, a graphics application 1220 included in program instructions 1215 may utilize GPU 1240 when modifying, rendering, or displaying images in some embodiments.

Those skilled in the art will appreciate that computer system 1200 is merely illustrative and is not intended to limit the scope of a method and apparatus for structure preserving deformations in digital images as described herein. In particular, the computer system and devices may include any combination of hardware or software that can perform the indicated functions, including computers, network devices, internet appliances, PDAs, wireless phones, pagers, etc. Computer system 1200 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1200 may be transmitted to computer system 1200 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium. Accordingly, the present invention may be practiced with other computer system configurations.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent exemplary embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A computer accessible storage medium storing program instructions executable by a processor to implement:
   receiving an image, wherein the image comprises an input scene, wherein the input scene comprises one or more objects;
   associating a distribution of pins with the input scene, wherein each pin is associated with a respective portion of the input scene, wherein said associating operates to transform the image into a first deformation domain;
   receiving symmetry information regarding one or more symmetries among the one or more objects in the input scene;
   receiving input to deform the input scene;
   mapping the input scene from the first deformation domain into a second deformation domain in response to the input, wherein said mapping generates a corresponding output scene in the second deformation domain, and wherein the mapping operates to preserve the one or more symmetries;
   detecting structural similarities and local similarities between the first and the second deformation domains; and
   transforming the output scene from the second deformation domain into an output image while preserving both the structural and the local similarities.

2. The computer accessible storage medium of claim 1, wherein the received symmetry information comprises one or more of:
   detected symmetries among the one or more objects in the input scene; and
   user input indicating at least one of the one or more objects in the input scene.

3. The computer accessible storage medium of claim 1, wherein the distribution of pins comprises a non-regular distribution of pins associated with the input scene.

4. The computer accessible storage medium of claim 1, wherein the distribution of pins comprises a regular grid of pins associated with the input scene.

5. The computer accessible storage medium of claim 1, wherein the image comprises one or more global structures, comprising one or more of:
   one or more symmetries;
   one or more grid patterns; or
   one or more line features.

6. The computer accessible storage medium of claim 5, wherein the one or more symmetries comprise one or more of:
   one or more reflectional symmetries;
   one or more rotational symmetries; or
   one or more translational symmetries.

7. The computer accessible storage medium of claim 5, wherein the one or more line features comprise one or more of:
   one or more line segments; or
   one or more vanishing points.

8. The computer accessible storage medium of claim 1, wherein said transforming comprises optimizing the structural similarities and the local similarities with respect to the input.

9. The computer accessible storage medium of claim 8, wherein said optimizing comprises optimizing running time and approximation accuracy of said transforming.

10. The computer accessible storage medium of claim 8, wherein said optimizing comprises optimizing in multiple stages, each stage directed to a respective type of free variable in said optimizing.

11. The computer accessible storage medium of claim 10, wherein said optimizing in multiple stages comprises:
    performing a first stage, comprising optimizing non-linear structure parameters while treating linear structure parameters, vertex positions, and transformations as latent variables;
    performing a second stage, comprising optimizing linear structure parameters with fixed non-linear structure parameters, while treating vertex positions and transformations as latent variables; and
    performing a third stage, comprising optimizing vertex positions and transformations with fixed structure parameters.

12. The computer accessible storage medium of claim 11, wherein said optimizing non-linear structure parameters comprises alternating between:
    optimizing vertex positions; and
    optimizing rotations and structure parameters.

13. The computer accessible storage medium of claim 11, wherein said optimizing linear structure parameters with fixed non-linear structure parameters comprises alternating between:
    optimizing vertex positions;
    releasing exact structure constraints; and
    optimizing rotations and linear structure parameters.

14. The computer accessible storage medium of claim 11, wherein said optimizing vertex positions and transformations with fixed structure parameters comprises alternating between:
    optimizing vertex positions; and
    optimizing rotations and linear structure parameters.

15. The computer accessible storage medium of claim 8, wherein said optimizing comprises optimizing repetition counts of grid patterns in the image, comprising:
- estimating respective optimal regions of each grid pattern via one or more rounds of optimization; and
- determining optimal repetition counts and/or modifying the second deformation domain and its mapping from the first deformation domain, using the estimated respective optimal regions of each grid pattern.

16. The computer accessible storage medium of claim 8, wherein said optimizing comprises minimizing energy, comprising minimizing a weighted sum of handle energy, shape energy, and structure energy, subject to handle constraints and/or fixed constraints.

17. The computer accessible storage medium of claim 8,
- wherein each of the first and second deformation domains comprises a respective set of vertices, wherein the first and second deformation domains are related by one or more ranked chart correspondences, each chart correspondence comprising one or more ranked vertex correspondences between the respective sets of vertices, wherein the rank of a chart correspondence comprises the rank of a center vertex correspondence, and wherein each chart correspondence is associated with a respective transformation;
- wherein the input scene is embedded in the first deformation domain in accordance with respective non-negative weights of the ranked chart correspondences; and
- wherein the output scene is generated by computing vertices in the output scene corresponding to vertices in the input scene based on partition of unity in accordance with the ranks of the chart correspondences and their corresponding transformations.

18. The computer accessible storage medium of claim 17, wherein each vertex correspondence comprises:
- a zero to one correspondence;
- a one to one correspondence; or
- a one to many correspondence.

19. A method for editing images, comprising:
performing, by one or more electronic computing devices:
- receiving an image, wherein the image comprises an input scene, wherein the input scene comprises one or more objects;
- associating a distribution of pins with the input scene, wherein each pin is associated with a respective portion of the input scene, wherein said associating operates to transform the image into a first deformation domain;
- receiving symmetry information regarding one or more symmetries among the one or more objects in the input scene;
- receiving input to deform the input scene;
- mapping the input scene from the first deformation domain into a second deformation domain in response to the input, wherein said mapping generates a corresponding output scene in the second deformation domain, and wherein the mapping operates to preserve the one or more symmetries;
- detecting structural similarities and local similarities between the first and the second deformation domains; and
- transforming the output scene from the second deformation domain into an output image while preserving both the structural and the local similarities.

20. The method of claim 19, wherein the received symmetry information comprises one or more of:
- detected symmetries among the one or more objects in the input scene; and
- user input indicating at least one of the one or more objects in the input scene.

21. The method of claim 19,
- wherein the distribution of pins comprises a non-regular distribution of pins associated with the input scene.

22. The method of claim 19,
- wherein the distribution of pins comprises a regular grid of pins associated with the input scene.

23. The method of claim 19, wherein the image comprises one or more global structures, comprising one or more of:
- one or more symmetries;
- one or more grid patterns; or
- one or more line features.

24. The method of claim 23, wherein the one or more symmetries comprise one or more of:
- one or more reflectional symmetries;
- one or more rotational symmetries; or
- one or more translational symmetries.

25. The method of claim 23, wherein the one or more line features comprise one or more of:
- one or more line segments; or
- one or more vanishing points.

26. The method of claim 19,
- wherein said transforming comprises optimizing the structural similarities and the local similarities with respect to the input.

27. The method of claim 26,
- wherein said optimizing comprises optimizing running time and approximation accuracy of said transforming.

28. The method of claim 26, wherein said optimizing comprises optimizing in multiple stages, each stage directed to a respective type of free variable in said optimizing.

29. The method of claim 28, wherein said optimizing in multiple stages comprises:
- performing a first stage, comprising optimizing non-linear structure parameters while treating linear structure parameters, vertex positions, and transformations as latent variables;
- performing a second stage, comprising optimizing linear structure parameters with fixed non-linear structure parameters, while treating vertex positions and transformations as latent variables; and
- performing a third stage, comprising optimizing vertex positions and transformations with fixed structure parameters.

30. The method of claim 29, wherein said optimizing non-linear structure parameters comprises alternating between:
- optimizing vertex positions; and
- optimizing rotations and structure parameters.

31. The method of claim 29, wherein said optimizing linear structure parameters with fixed non-linear structure parameters comprises alternating between:
- optimizing vertex positions;
- releasing exact structure constraints; and
- optimizing rotations and linear structure parameters.

32. The method of claim 29, wherein said optimizing vertex positions and transformations with fixed structure parameters comprises alternating between:
- optimizing vertex positions; and
- optimizing rotations and linear structure parameters.

33. The method of claim 26, wherein said optimizing comprises optimizing repetition counts of grid patterns in the image, comprising:
- estimating respective optimal regions of each grid pattern via one or more rounds of optimization; and determining optimal repetition counts and/or modifying the second deformation domain and its mapping from the first deformation domain, using the estimated respective optimal regions of each grid pattern.

34. The method of claim 26, wherein said optimizing comprises minimizing energy, comprising minimizing a weighted sum of handle energy, shape energy, and structure energy, subject to handle constraints and/or fixed constraints.

35. The method of claim 26,
wherein each of the first and second deformation domains comprises a respective set of vertices, wherein the first and second deformation domains are related by one or more ranked chart correspondences, each chart correspondence comprising one or more ranked vertex correspondences between the respective sets of vertices, wherein the rank of a chart correspondence comprises the rank of a center vertex correspondence, and wherein each chart correspondence is associated with a respective transformation;
wherein the input scene is embedded in the first deformation domain in accordance with respective non-negative weights of the ranked chart correspondences; and
wherein the output scene is generated by computing vertices in the output scene corresponding to vertices in the input scene based on partition of unity in accordance with the ranks of the chart correspondences and their corresponding transformations.

36. The method of claim 35, wherein each vertex correspondence comprises:
a zero to one correspondence;
a one to one correspondence; or
a one to many correspondence.

37. A computer system, comprising:
a processor; and
a memory medium, wherein the memory medium stores program instructions executable by the processor to:
receive an image, wherein the image comprises an input scene, wherein the input scene comprises one or more objects;
associate a distribution of pins with the input scene, wherein each pin is associated with a respective portion of the input scene, wherein said associating operates to transform the image into a first deformation domain;
receive symmetry information regarding one or more symmetries among the one or more objects in the input scene;
receive input to deform the input scene;
map the input scene from the first deformation domain into a second deformation domain in response to the input, wherein said mapping generates a corresponding output scene in the second deformation domain, and wherein the mapping operates to preserve the one or more symmetries;
detect structural similarities and local similarities between the first and the second deformation domains; and
transform the output scene from the second deformation domain into an output image while preserving both the structural and the local similarities.

38. The system of claim 37, wherein the received symmetry information comprises one or more of:
detected symmetries among the one or more objects in the input scene; and
user input indicating at least one of the one or more objects in the input scene.

39. The system of claim 37,
wherein the distribution of pins comprises a non-regular distribution of pins associated with the input scene.

40. The system of claim 37,
wherein the distribution of pins comprises a regular grid of pins associated with the input scene.

41. The system of claim 37, wherein the image comprises one or more global structures, comprising one or more of:
one or more symmetries;
one or more grid patterns; or
one or more line features.

42. The system of claim 41, wherein the one or more symmetries comprise one or more of:
one or more reflectional symmetries;
one or more rotational symmetries; or
one or more translational symmetries.

43. The system of claim 41, wherein the one or more line features comprise one or more of:
one or more line segments; or
one or more vanishing points.

44. The system of claim 37,
wherein to transform the output scene, the program instructions are executable to optimize the structural similarities and the local similarities with respect to the input.

45. The system of claim 44,
wherein to optimize the structural similarities and the local similarities, the program instructions are executable to optimize running time and approximation accuracy of said transforming.

46. The system of claim 44, wherein to optimize the structural similarities and the local similarities, the program instructions are executable to optimize in multiple stages, each stage directed to a respective type of free variable in said optimizing.

47. The system of claim 46, wherein to optimize in multiple stages, the program instructions are executable to:
perform a first stage, comprising optimizing non-linear structure parameters while treating linear structure parameters, vertex positions, and transformations as latent variables;
perform a second stage, comprising optimizing linear structure parameters with fixed non-linear structure parameters, while treating vertex positions and transformations as latent variables; and
perform a third stage, comprising optimizing vertex positions and transformations with fixed structure parameters.

48. The system of claim 47, wherein to optimize non-linear structure parameters, the program instructions are executable to alternate between:
optimizing vertex positions; and
optimizing rotations and structure parameters.

49. The system of claim 47, wherein to optimize linear structure parameters with fixed non-linear structure parameters, the program instructions are executable to alternate between:
optimizing vertex positions;
releasing exact structure constraints; and
optimizing rotations and linear structure parameters.

50. The system of claim 47, wherein to optimize vertex positions and transformations with fixed structure parameters, the program instructions are executable to alternate between:
optimizing vertex positions; and
optimizing rotations and linear structure parameters.

51. The system of claim 44, wherein to optimize the structural similarities and the local similarities, the program instructions are executable to optimize repetition counts of grid patterns in the image, comprising:

estimating respective optimal regions of each grid pattern via one or more rounds of optimization; and determining optimal repetition counts and/or modifying the second deformation domain and its mapping from the first deformation domain, using the estimated respective optimal regions of each grid pattern.

52. The system of claim 44, wherein to optimize the structural similarities and the local similarities, the program instructions are executable to minimize energy, comprising minimizing a weighted sum of handle energy, shape energy, and structure energy, subject to handle constraints and/or fixed constraints.

53. The system of claim 44, wherein each of the first and second deformation domains comprises a respective set of vertices, wherein the first and second deformation domains are related by one or more ranked chart correspondences, each chart correspondence comprising one or more ranked vertex correspondences between the respective sets of vertices, wherein the rank of a chart correspondence comprises the rank of a center vertex correspondence, and wherein each chart correspondence is associated with a respective transformation;

wherein the input scene is embedded in the first deformation domain in accordance with respective non-negative weights of the ranked chart correspondences; and wherein the output scene is generated by computing vertices in the output scene corresponding to vertices in the input scene based on partition of unity in accordance with the ranks of the chart correspondences and their corresponding transformations.

54. The system of claim 53, wherein each vertex correspondence comprises:

a zero to one correspondence;

a one to one correspondence; or a one to many correspondence.

55. A computer-implemented method, comprising:

executing instructions on a specific electronic computing device so that binary digital electronic signals representing an image are received, wherein the image comprises an input scene, wherein the input scene comprises one or more objects;

executing instructions on said specific electronic computing device so that binary digital electronic signals representing a distribution of pins are associated with the input scene, wherein each pin is associated with a respective portion of the input scene, wherein said associating operates to transform the image into a first deformation domain;

executing instructions on said specific electronic computing device so that binary digital electronic signals representing symmetry information regarding one or more symmetries among the one or more objects in the input scene are received;

executing instructions on said specific electronic computing device so that binary digital electronic signals representing input to deform the input scene are received;

executing instructions on said specific electronic computing device so that binary digital electronic signals representing the input scene are mapped from the first deformation domain into a second deformation domain in response to the input, wherein said mapping generates a corresponding output scene in the second deformation domain, and wherein the mapping operates to preserve the one or more symmetries;

executing instructions on said specific electronic computing device so that binary digital electronic signals representing structural similarities and local similarities between the first and the second deformation domains are detected; and executing instructions on said specific electronic computing device so that binary digital electronic signals representing the output scene are transformed from the second deformation domain into an output image while preserving both the structural and the local similarities; and storing the output image in a memory location of said specific electronic computing device for later use.

* * * * *